US008079943B2

(12) United States Patent
Kim

(10) Patent No.: US 8,079,943 B2
(45) Date of Patent: Dec. 20, 2011

(54) DEVELOPING ROLLER INCLUDING CARBON NANOTUBES FOR ELECTROPHOTOGRAPHIC DEVICE AND METHOD FOR FABRICATING THE DEVELOPING ROLLER

(75) Inventor: In Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1204 days.

(21) Appl. No.: 11/377,720

(22) Filed: Mar. 17, 2006

(65) Prior Publication Data

US 2007/0003329 A1 Jan. 4, 2007

(30) Foreign Application Priority Data

Jun. 23, 2005 (KR) ........................ 10-2005-0054476

(51) Int. Cl.
*F16C 13/00* (2006.01)
*B21K 1/02* (2006.01)

(52) U.S. Cl. ............................... 492/56; 492/48; 492/53

(58) Field of Classification Search .................... 492/56, 492/48, 53; 29/895.3, 895.32
See application file for complete search history.

(56) References Cited

U.S. PATENT DOCUMENTS

| | | | | |
|---|---|---|---|---|
| 6,819,899 | B2 * | 11/2004 | Miyakawa et al. | 399/252 |
| 6,829,454 | B2 * | 12/2004 | Miyakawa et al. | 399/159 |
| 6,875,550 | B2 * | 4/2005 | Miyakawa et al. | 430/108.6 |
| 6,994,942 | B2 * | 2/2006 | Miyakawa et al. | 430/108.1 |
| 7,022,447 | B2 * | 4/2006 | Miyakawa | 430/108.6 |
| 7,027,758 | B2 * | 4/2006 | Miyakawa et al. | 399/159 |
| 7,190,928 | B2 * | 3/2007 | Miyakawa et al. | 399/302 |
| 7,358,019 | B2 * | 4/2008 | Toyama et al. | 430/123.5 |
| 7,502,580 | B2 * | 3/2009 | Hays | 399/272 |
| 2003/0139270 | A1 * | 7/2003 | Jung et al. | 492/56 |
| 2003/0185596 | A1 * | 10/2003 | Kellie et al. | 399/240 |
| 2004/0227802 | A1 | 11/2004 | Liaw et al. | |
| 2006/0034645 | A1 * | 2/2006 | Lee et al. | 399/276 |
| 2006/0056879 | A1 * | 3/2006 | Jung et al. | 399/239 |
| 2006/0292360 | A1 * | 12/2006 | Hays et al. | 428/323 |
| 2007/0003329 | A1 * | 1/2007 | Kim | 399/286 |
| 2007/0154240 | A1 * | 7/2007 | Elbert et al. | 399/176 |
| 2008/0038652 | A1 * | 2/2008 | Bender | 430/59.1 |
| 2008/0317515 | A1 * | 12/2008 | Anan et al. | 399/286 |
| 2009/0061109 | A1 * | 3/2009 | Yamauchi et al. | 427/579 |

(Continued)

FOREIGN PATENT DOCUMENTS

JP 2004-94161 3/2004

(Continued)

OTHER PUBLICATIONS

Machine English translation of JP 2004-101958.*

(Continued)

*Primary Examiner* — Essama Omgba
(74) *Attorney, Agent, or Firm* — Roylance, Abrams, Berdo & Goodman, L.L.P.

(57) ABSTRACT

A development roller for electrophotographic device and a method of making the development roller are disclosed. The development roller according to the present invention includes a central shaft and a roller body. The roller body is composed of an elastic polymer material as a primary material and carbon nanotubes in an amount to provide the conductivity of the roller body. According to the present invention, the development roller can exhibit a low hardness and a low resistance at the same time, produce images having high sharpness, and does not contaminate images.

5 Claims, 3 Drawing Sheets

U.S. PATENT DOCUMENTS

| | | | | |
|---|---|---|---|---|
| 2009/0117303 | A1 * | 5/2009 | Goshiki | 428/36.9 |
| 2009/0123185 | A1 * | 5/2009 | Lin et al. | 399/176 |
| 2009/0160920 | A1 * | 6/2009 | Badesha et al. | 347/88 |
| 2010/0046989 | A1 * | 2/2010 | Anan et al. | 399/286 |
| 2010/0151245 | A1 * | 6/2010 | Law et al. | 428/375 |
| 2010/0183348 | A1 * | 7/2010 | Law et al. | 399/333 |

FOREIGN PATENT DOCUMENTS

| | | | | |
|---|---|---|---|---|
| JP | 2004094161 | A | * | 3/2004 |
| JP | 2004-101958 | | | 4/2004 |
| JP | 2004-279916 | | | 10/2004 |
| JP | 2004279916 | A | * | 10/2004 |
| JP | 2005062474 | A | * | 3/2005 |
| JP | 2005062475 | A | * | 3/2005 |
| JP | 2005220316 | A | * | 8/2005 |
| JP | 2007304374 | A | * | 11/2007 |
| KR | 10-2004-0043701 | | | 5/2004 |
| KR | 10-2004-0106947 | | | 12/2004 |

OTHER PUBLICATIONS

English machine translation of JP 2005-062474 A.*
English machine translation of JP 2005-062475A.*

* cited by examiner

DEVELOPING ROLLER INCLUDING CARBON NANOTUBES FOR ELECTROPHOTOGRAPHIC DEVICE AND METHOD FOR FABRICATING THE DEVELOPING ROLLER

CROSS-REFERENCE TO RELATED APPLICATION

This application claims benefit under 35 U.S.C. §119(a) of Korean Patent Application No. 2005-54476, filed Jun. 23, 2005 in the Korean Intellectual Property Office, the entire contents of which are hereby incorporated by reference.

BACKGROUND OF THE INVENTION

1. Field of the Invention

The present invention relates to a development roller. In particular, the invention is directed to a development roller including carbon nanotubes for an electrophotographic device capable of maintaining sharpness of an image while keeping a low resistance and the development roller elastic.

2. Description of the Related Art

Examples of the electrophotographic device include a copy machine, a printer, a facsimile, a composite apparatus, and so forth.

FIG. 1 shows a laser printer among those examples, FIG. 2A shows a development roller of the laser printer shown in FIG. 1, and FIG. 2B is a cross-sectional view of FIG. 2A. The same elements in the same figures refer to the same reference numerals.

An operation principle of the laser printer will be described with reference to FIG. 1.

Toners stored in a toner storage are uniformly and electrically agitated by an agitator. Mechanical and electrical powers of a supply roller 300 attach the agitated toners to a surface of the development roller 200 having a predetermined surface voltage. A blade installed above the development roller 200 then spreads the toners attached on the surface of the development roller 200 to a uniform thickness.

An electrifying roller equally electrifies a surface of a photo-sensitive drum 400 with a high pressure while rotating with the photo-sensitive drum 400. A Laser Scanner Unit (LSU) irradiates a laser beam on the surface of the electrified photo-sensitive drum 400 with a constant voltage to form an electrostatic latent image. The thin layer of the toner uniformly attached on the surface of the development roller 200 are attached to a position where the electrostatic latent image is formed so that a toner image is formed. The toner image is then transferred to a recording medium by a transfer roller.

Referring to FIG. 2A, the development roller 200 is composed of an elastic roller body 210 and a central shaft 220 formed of metal and inserted into the roller body. A high voltage is applied via the shaft 220 so that a surface electric potential is generated on the surface of the roller body 210.

The development roller is classified as a polymer roller and a metal roller according to its primary material. The polymer roller may be classified further as an ion conductive type and an electron conductive type. The ion conductive type is fabricated by adding a salt, generally, an alkoxide salt. The ion conductive type development roller is universal because of its advantageous cost. However, This type has the disadvantage of a high drift in resistance of the roller in response to low temperature and low wet circumstance and high temperature and high wet circumstance. This type also has difficulty in implementing low resistance, and has image defects due to movements of molecules which have not been cross-linked onto the surface of the roller.

The electron conductive type is fabricated by adding a carbon black to the elastic roller body. However, when the excessive carbon black is added so as to implement the desired low resistance, a hardness of the roller body increases to add extra weight to a toner stress, which in turn rapidly degrades the toner durability to weaken the roller durability, so that a life time of the development roller is shortened. In addition, dispersibility of the carbon black is degraded to cause the resistance value to lack uniformity. In addition, the carbon black as fine particles flows out of the roller body to contaminate the inside of the electrophotographic device and the images.

SUMMARY OF THE INVENTION

It is therefore a first object of the present invention to provide a development roller including carbon nanotubes for an electrophotographic device that is capable of producing a high quality of an image by implementing a low hardness and a low resistance.

It is a second object of the present invention to provide a method of fabricating a development roller including carbon nanotubes for an electrophotographic device that is capable of producing a high quality of an image by implementing a low hardness and a low resistance.

According to the first aspect of the present invention, a development roller for electrophotographic device includes: a central shaft and a roller body, where the roller body is composed of an elastic polymer material as a primary material and carbon nanotubes in an amount to provide conductivity to the roller body.

The elastic polymer material includes an elastic polymer material selected from a group consisting of acrylonitrile rubber, styrenebutadiene rubber, polyurethane, ethylene propylene diene terpolymer, silicon rubber, epichlorohydrin rubber, chloroprene rubber, natural rubber, acrylic rubber, a thermoplastic vulcanizates, thermoplastic olefin, and the like.

The elastic polymer material is preferably a polyurethane.

The roller body contains the carbon nanotubes in an amount of preferably 0.01 phr to 2.0 phr, and more preferably, 0.1 phr to 1.0 phr.

The carbon nanotube is a single wall type or a multi wall type.

A resistance of the development roller is $1\times10^{3}\Omega\cdot$cm to $1\times10^{8}\Omega\cdot$cm.

A hardness of the development roller is 30° to 50° in accordance with the Japanese Industrial Stand (JIS).

According to the second aspect of the present invention, a method of fabricating a development roller for electrophotographic device includes the steps of: measuring an elastic polymer material and a carbon nanotube and mixing them together; molding the mixture into a mold shaped body of a development roller; and heating the molded body in an oven to fabricate a body of the development roller.

The elastic polymer material contains an elastic polymer material selected from a group consisting of acrylonitrile rubber, styrenebutadiene rubber, polyurethane, ethylene propylene diene terpolymer, silicon rubber, epichlorohydrin rubber, chloroprene rubber, natural rubber, acrylic rubber, a thermoplastic vulcanizates, thermoplastic olefin, and the like.

The elastic polymer material is preferably a polyurethane.

When the elastic polymer material is preferably the polyurethane, mixing the elastic polymer material and the carbon nanotube preferably includes mixing a chain extender together.

In this case, mixing the elastic polymer material and the carbon nanotube preferably includes mixing an additive together, where the additive includes an amine based accelerator or a phenol based accelerator.

The amount of the carbon nanotube in the polymer material is preferably 0.01 phr to 2.0 phr.

The development roller preferably has a hardness of 30° to 50° in accordance with the JIS.

These and other aspects of the invention will become apparent from the following detailed description of the invention in conjunction with the annexed drawings which disclose various embodiments of the invention.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, the present invention will be described in detail with reference to accompanying drawings.

The development roller for electrophotographic device according to the present invention includes a central shaft formed of metal and a roller body surrounding the central shaft. The roller body is formed of an elastic polymer material and carbon nanotubes.

The elastic polymer material and the carbon nanotube are measured and then combined to fabricate the development roller for electrophotographic device according to the present invention.

In general, the elastic polymer material shows a nonconductive property that materials such as carbon black, metal powder, fiber or an electrically conductive polymer material are mixed with an insulating material to provide the electron conductivity to the elastic polymer. The elastic polymer material with the conductivity is also referred to as a conductive composite.

A method of fabricating the conductive composite is used in electric and electronic industries. Research for maintaining the conductivity constant and enhancing workability are still being conducted. Among several materials, carbon black is an additive widely used to provide the conductivity to the nonconductive elastic polymer material. However, when excessive carbon blacks are added for implementing the low resistance, the resultant hardness increases and the resultant problems occur. This makes it difficult to implement the low resistance and the low hardness at the same time.

The present invention uses the carbon nanotube as the material for providing the conductivity to the elastic polymer material. The carbon nanotube has a carbon structure of long and thin tubes. One carbon atom is bonded to three other carbon atoms to form a hexagonal structure. The structure of the carbon nanotube is discussed herein in connection with FIGS. 3A to 3D.

Figure 1:
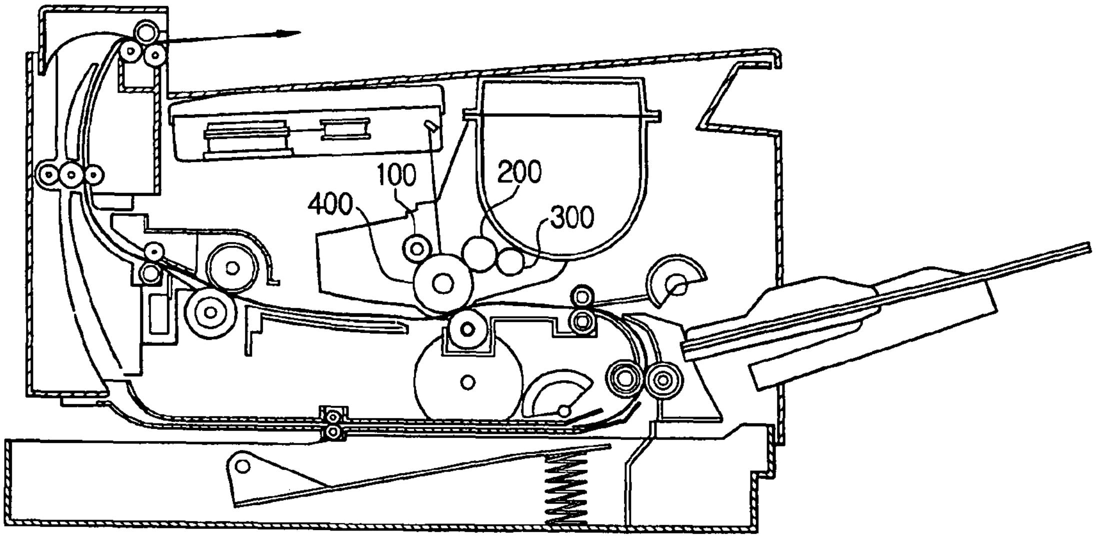
FIG. 1 PRIOR ART
FIG. 1 is a schematic view illustrating a laser printer as an example of the electrophotographic device.
Figure 2A:
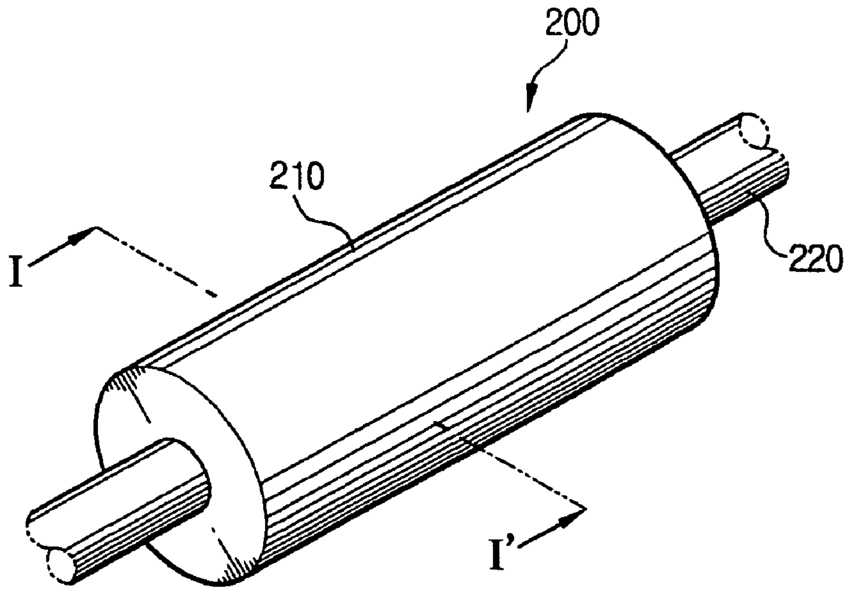
FIG. 2A PRIOR ART
FIG. 2A is a schematic view illustrating an embodiment of a development roller of the laser printer of FIG. 1.
Figure 2B:
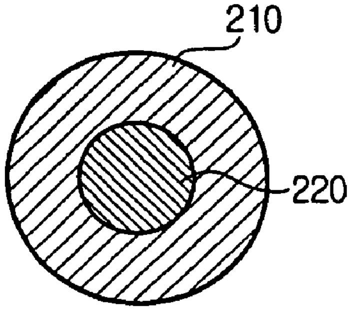
FIG. 2B PRIOR ART
FIG. 2B is a cross-sectional view of FIG. 2A.
Figure 3A:
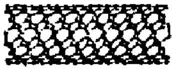
FIG. 3A shows a single wall type nanotube having an arm chair structure as an example of carbon nanotube which can be employed in the present invention.
Figure 3B:
FIG. 3B shows a single wall type nanotube having a zigzag structure as an example of carbon nanotube which can be employed in the present invention.
Figure 3C:
FIG. 3C shows a multi wall type nanotube rope as an example of carbon nanotube which can be employed in the present invention.
Figure 3D:
FIG. 3D shows a multi wall type nanotube as an example of carbon nanotube which can be employed in the present invention.

A single wall structure having an armchair structure shown in FIG. 3A is an electric conductor similar to a metal, and having a zigzag structure shown in FIG. 3B is a semiconductor. In addition, a multi wall structure may be classified as a cluster type structure such as the nanotube rope (FIG. 3C) and a multi wall structure (FIG. 3D) as a result of its rolling shape.

When one nanotube exists, two energy bands can cross each other because of mirror symmetry to produce a metallic conductor. However, when tubes are clustered, other atoms are bonded to the tubes, or the tubes are suitably deformed, the mirror symmetry is broken to cause the crossed energy bands to separate so that a semiconductor is produced.

The property of the carbon nanotube is utilized in the present invention so that the carbon nanotube is used as an additive for providing the conductivity to the development roller at the time of fabricating the development roller. The durability of the development roller containing the carbon nanotubes is also enhanced by the intrinsic property of the carbon nanotubes.

The carbon nanotubes employed in the present invention are a single wall type nanotube which preferably has a degree of purity of 40 vol. % to 90 vol. %, a diameter of 1 nm to 1.2 nm, and a length of 5 μm to 20 μm. However, in order to use the carbon nanotube having a degree of purity of 95 vol. % or higher, a multi wall type nanotube may be employed which is fabricated by a plasma enhanced chemical vapor deposition (PECVD) method and has a diameter of 3 nm to 15 nm and a length of 10 μm to 20 μm.

An amount of carbon nanotubes included in the roller body of the development roller according to the present invention is preferably 0.1 phr or 2.0 phr. More preferably, the amount is 0.1 phr to 1.0 phr.

The unit 'phr' used herein means part per hundred parts of rubber, which indicates one part by weight of the additive with respect to 100 parts by weight of the elastic body to which the additive is added. When the amount of the carbon nanotubes is less than 0.1 phr, the conductivity cannot be obtained in the development roller. When the amount is more than 2.0 phr, the hardness may increase to cause toner stress and degradation of the image because the low hardness of the elastic body cannot be retained. The dispersibility of the excessively added carbon nanotube may also be degraded to cause the resistance to lack uniformity.

Examples of the elastic polymer material as the primary material of the body of the development roller according to the present invention may include acrylonitrile rubber, styrenebutadiene rubber, polyurethane, ethylene propylene diene terpolymer, silicon rubber, epichlorohydrin rubber, chloroprene rubber, natural rubber, acrylic rubber, a thermoplastic vulcanizates, thermoplastic olefin, and the like, but not necessarily limited thereto.

Preferably, a polyurethane is employed.

When the elastic polymer material is a polyurethane, a chain extender is combined together at the time of combining the elastic polymer material and the carbon nanotubes. The polyurethane is formed by reacting a diisocyanate and a polyol. The reaction is exothermic so that a small amount of the diisocyanate is separately made to react to the polyol several times.

Polyester polyol or polyether polyol may be used as the polyol of the present invention because there is no difference in hardness and resistance. Preferably, the polyester polyol is used because of its good mechanical durability.

Examples of the diisocyanate compound used in the present invention may include hexamethylene diisocyanate, tetramethylene diisocyanate, isoprene diisocyanate, 2,4-naphthylene diisocyanate, 4,4- diisocyanate diphenylether, and so forth, but are not limited thereto.

The diisocyanate is sealed and kept in cold storage to be dehydrated before use. The polyol is vacuum-dried to be dehydrated.

The carbon nanotube, the polyol, and a necessary additive are first mixed together. A small amount of diisocyanate is separately injected into the mixture several times to cause the polymerization reaction to proceed while adjusting the polymerization speed.

The diisocyanate is excessively added such that a 10% excessive of the dusocyanate is added greater than a mole ratio of diisocyanate:polyol (2:1). The amount of dusocyanate added is determined by the calculating the amount of the dusocyanate reacting to moisture in the air.

In this step, various additives may be combined together for enhancing functionablity. Preferably, an accelerator is added. Examples of suitable accelerators include an amine based accelerator or a phenol based accelerator.

A chain extender is then injected. The chain extender is injected for adjusting the molecular amount of the polyurethane. Examples of the chain extender used in the present invention include ethylene glycol, 1,2-propylene glycol, 1,4-butane diol, 1,5-pentane diol, neopentyl glycol, and so forth, but are not limited thereto.

The chain extender is added at the same mole ratio as that of the remaining diisocyanate which has not reacted to the polyol.

The compound is then placed into the mold and shaped to form a development roller. The resultant structure having the shape of the development roller is cast in an oven to fabricate a body. The body is then assembled with a metal shaft to fabricate the development roller.

The development roller according to the present invention preferably has a low resistance in a range of $1\times10^3\Omega\cdot cm$ to $1\times10^8\Omega\cdot cm$. When the resistance is too low, the roller becomes conductive. A roller of low resistance makes it difficult to attach the toner thereto. When the resistance is too high, gradation is degraded.

When the typical carbon black is used to provide such resistance, the amount must be 10 phr or more. In comparison to the present invention, a similar resistance range is obtained using the contained carbon nanotubes in an amount of 0.01 phr to 2 phr. Thus, the present invention can implement a low resistance with a significantly small amount of carbon nanotubes.

The development roller of the present invention preferably has an angle in a range of 30° to 50° in accordance with the Japanese Industrial Stand (JIS). When the hardness of the elastic layer of the development roller is less than 30°, the measurement accuracy cannot be obtained and noises occur in the images. When the hardness is greater than 50°, the toner stress increases causing the toners to be finely separated and the wear resistance of the roller to degrade.

Hereinafter, fabrication of the development roller and its evaluation result according to the present invention will be described in detail.

Embodiment

Fabrication of the body of the development roller

Example 1

The diisocyanate was sealed and kept in a cold storage to be dehydrated before use, and a mixture of 1,4-methylene diisocyanate and toluene diisocyanate was used for the same. The liquid polyether polyol was vacuum-dried and dehydrated for about one day in a vacuum oven at a temperature of 90° C. The carbon nanotube was a single wall type nanotube fabricated by an Arc discharge process. The carbon nanotubes had a degree of purity of 40 vol. % to 90 vol. %, a diameter of 1 nm to 1.2 nm, and a length of 5 μm to 20 μm. First, 1 mol of polyether polyol and carbon nanotube in an amount of 0.4 phr were mixed by a prepolymer method in a reaction container at an reaction temperature of 75° C. The prepolymer was mixed with an amine based accelerator in an amount of 0.5 mol, and 0.525 mol of diisocyanate was injected thereto four times.

1,4-butandiol of 1 mol was then injected.

The resulting prepolymer containing the carbon nanotubes was then placed into the mold shaped in the form of a development roller, which was cast in an oven by a casting method to finish the reaction.

As a result, the thermoplastic polyurethane roller body containing carbon nanotubes was fabricated.

Example 2

The same method was used as in Example 1 except that the carbon nanotube was used in an amount of 0.6 phr instead of 0.4 phr of the first embodiment, to fabricate the thermoplastic polyurethane roller body containing carbon nanotubes.

Example 3

The same method was used as in Example 1 except that the carbon nanotube was used in an amount of 0.8 phr instead of 0.4 phr of Example 1 and the polyester polyol was employed instead of polyether polyol of Example 1, to fabricate the thermoplastic polyurethane roller body containing carbon nanotubes.

Example 4

The same method was used as in Example 3 except that the carbon nanotube was used in an amount of 1.0 phr instead of 0.8 phr of Example 3, to fabricate the thermoplastic polyurethane roller body containing carbon nanotubes.

The following Table 1 shows the combination of the thermoplastic polyurethane roller body and the carbon nanotubes in accordance with the embodiments of Examples 1-4.

TABLE 1

| | Example 1 | Example 2 | Example 3 | Example 4 |
|---|---|---|---|---|
| Polyol | 1 mol | 1 mol | 1 mol | 1 mol |
| Diisocyanate | 2.1 mol | 2.1 mol | 2.1 mol | 2.1 mol |
| Carbon nanotube | 0.4 phr | 0.6 phr | 0.8 phr | 1.0 phr |

TABLE 1-continued

| | Example 1 | Example 2 | Example 3 | Example 4 |
|---|---|---|---|---|
| 1,4-butane diol | 1 mol | 1 mol | 1 mol | 1 mol |
| accelerator | 0.5 mol | 0.5 mol | 0.5 mol | 0.5 mol |

Comparative Example

The same method was used as in Example 1 except that the carbon black (VUCAN XC72R, Carbot Inc.) was used in an amount of 10 phr instead of the carbon nanotubes of 0.4 phr of Example 1, to fabricate the thermoplastic polyurethane roller body containing carbon blacks.

Test

The hardness and surface resistance of the thermoplastic polyurethane roller body containing carbon nanotubes of Example 1 to Example 4 and the thermoplastic polyurethane roller body containing carbon black of Comparative Example were tested.

The hardness of the roller body was measured by an A-type among ASKER durometers available from KBUNSHI INC. in Japan. The ASKER durometer measures the hardness of an elastic body such as rubber. The pressure pin of the durometer is 2.50 mm, and is shaped as a 35 crusible former, and has a cross-sectional diameter of 0.79 mm.

The surface resistance was measured at a temperature of 23° C. in a wet state of 55%.

The measured test results were shown in the following Table 2.

TABLE 2

| | First embodiment Ex 1 | Second embodiment Ex 2 | Third embodiment Ex 3 | Fourth embodiment Ex 4 |
|---|---|---|---|---|
| Hardness (Asker-A type) | 40 ± 2 | 40 ± 2 | 40 ± 2 | 40 ± 2 |
| Surface resistance (ohms/square) | $10^7$~$10^8$ | $10^3$~$10^5$ | $<10^3$ | $<10^3$ |

As can be seen from the Table 2, the hardness is about 40° in the development roller according to the embodiments of Examples 1-4 of the present invention, and had surface resistance in a range of $10^3$ to $10^8$.

The required surface resistance may be changed in response to the system of the electrophotographic device which the development roller is used. The surface resistance smaller than $10^3$ may be classified as the low resistance in the current system of the electrophotographic device. Therefore, the development roller of Example 1 to Example 4 can be regarded as implementing the low resistance and the low hardness.

In contrast, the Comparative Example has a the hardness of the development roller body of 61° and a surface resistance of $10^3$ to $10^6$. In this case, the carbon black was added in excess to classify the surface resistance as low resistance. The hardness of the Comparative Example was 61°, and showed a relatively high hardness.

As such, the development roller including carbon nanotubes for electrophotographic device according to the present invention as described above, can prevent the problem of the increased hardness of the development roller where an excess of carbon black is added to provide the low resistance. An excess of carbon black can leak from the surface of the development roller. The smaller molecules can move toward the surface of the ion conductive type development roller when a salt is used. In the present invention, the low resistance and the low hardness can be attained at the same time.

In addition, the wear resistance of the development roller itself can be enhanced because the carbon nanotubes have good intrinsic durability.

In addition, dispersiblity in the development roller is good because of the structural property of the carbon nanotube, so that the surface resistances of the development roller can be uniformly distributed.

Moreover, a relatively small amount of carbon nanotubes can be added so that the fabrication process can reduce the manufacturing costs.

The foregoing embodiments and advantages are merely exemplary and are not to be construed as limiting the present invention. The present teaching can be readily applied to other types of-apparatuses. Also, the description of the embodiments of the present invention is intended to be illustrative, and not to limit the scope of the claims, and many alternatives, modifications, and variations will be apparent to those skilled in the art.

What is claimed is:

1. A development roller for an electrophotographic device, comprising:

a central shaft and a roller body;

wherein the roller body is composed of an elastic polymer material as a primary material, and carbon nanotubes in an amount effective to provide electrical conductivity to the roller body, wherein the carbon nanotubes are included in an amount of 0.1 phr to 1.0 phr to provide a surface resistance of $1\times10^3\Omega\cdot cm$ to $1\times10^8\Omega\cdot cm$ and a hardness of 30° to 50° as measured according to the Japanese Industrial Standard (JIS), said carbon nanotubes comprising single wall carbon nanotubes having a degree of purity of 70 vol % to 90 vol % and a length of 5 μm to 10 μm.

2. The development roller for electrophotographic device according to claim 1, wherein the elastic polymer material includes an elastic polymer material selected from a group consisting of acrylonitrile rubber, styrenebutadiene rubber, polyurethane, ethylene propylene diene terpolymer, silicon rubber, epichlorohydrin rubber, chloroprene rubber, natural rubber, acrylic rubber, a thermoplastic vulcanizates, and thermoplastic olefin.

3. The development roller for electrophotographic device according to claim 2, wherein the elastic polymer material is polyurethane.

4. The development roller of claim 1, wherein the development roller has a hardness of about 40 as measured by an A-type ASKER durometer.

5. A development roller for an electrophotographic device comprising:

a central shaft and a roller body;

wherein the roller body is composed of a elastic polymer material as a primary material, and carbon nanotubes in an amount effective to provide electrical conductivity to the roller body, wherein the carbon nanotubes are included in a amount of 0.1 phr to 1.0 phr to provide a surface resistance of $1\times10^3\Omega\cdot cm$ to $1\times10^8\Omega\cdot cm$ and a hardness of 30° to 50° as measured according to the Japanese Industrial Standard (JIS), said carbon nanotubes being selected from the group consisting of (a) single wall carbon nanotubes having a degree of purity of 70 vol % to 90 vol % and a length of 5 μm to 10 μm and (b) multi wall carbon nanotubes having a degree of purity of 95 vol % or more, a diameter of 3 nm to 15 nm, and a length of 10 μm to 20 μm.

* * * * *